United States Patent
Pawsat

[15] 3,642,305
[45] Feb. 15, 1972

[54] BICYCLE TRAINING WHEEL BRACKET

[72] Inventor: Carlton P. Pawsat, Maysville, Ky.
[73] Assignee: Wald Manufacturing Company, Incorporated, Maysville, Ky.
[22] Filed: Jan. 16, 1970
[21] Appl. No.: 3,359

[52] U.S. Cl. ............................. 280/293, 248/230, 248/300
[51] Int. Cl. ........................................................... B62h 1/10
[58] Field of Search ............... 280/304, 293; 248/230, 289, 248/300

[56] References Cited

UNITED STATES PATENTS

| | | |
|---|---|---|
| 2,855,107 | 10/1958 | Roth ............................. 248/300 X |
| 2,527,431 | 10/1950 | Kutil ............................. 280/293 |
| 2,530,498 | 11/1950 | Atwood et al. ............... 280/304 |
| 2,828,141 | 3/1958 | Erstad et al. ................. 280/304 |
| 2,784,008 | 3/1957 | Pearl ............................. 280/304 |

*Primary Examiner*—Kenneth H. Betts
*Attorney*—J. Warren Kinney, Jr.

[57] ABSTRACT

The training wheel attachment includes a wheel bracket and a torque arm so shaped and related to one another, as to avoid installation interference with the rear fork members of a bicycle frame. Eliminates the need for auxiliary spacing washers, and ensures a safe solid mounting upon the rear fork without cocking or distorting the constituent parts.

18 Claims, 3 Drawing Figures

PATENTED FEB 15 1972 3,642,305
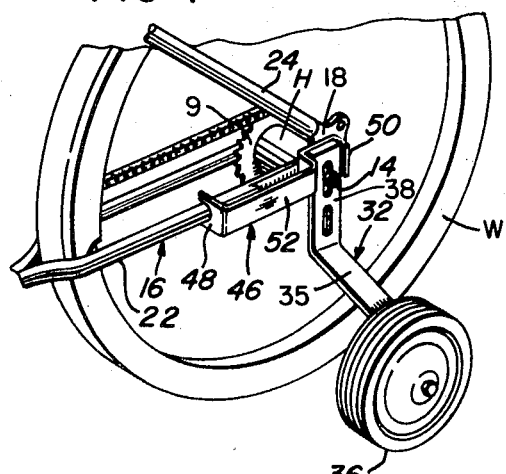
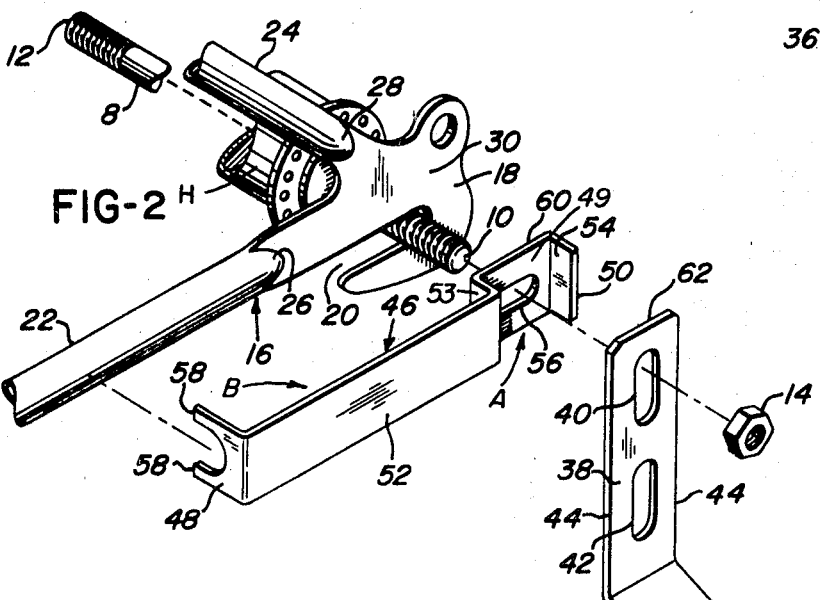
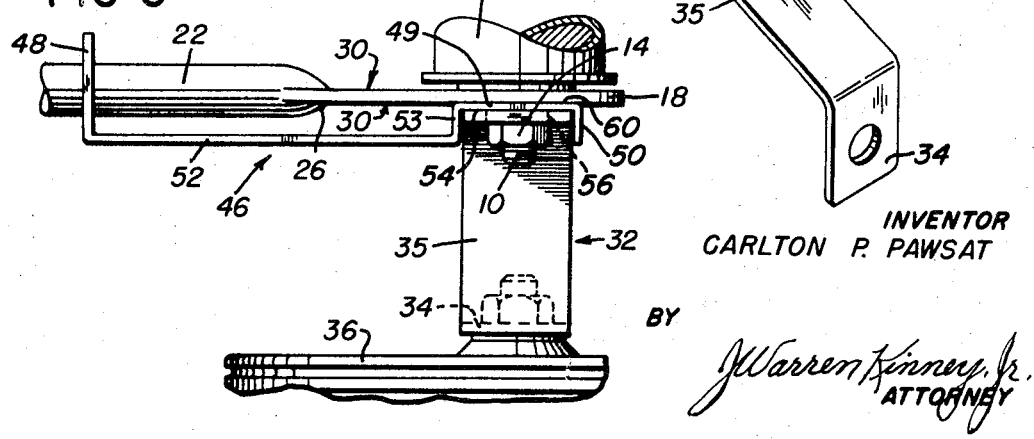
INVENTOR
CARLTON P. PAWSAT
BY
J. Warren Kinney, Jr.
ATTORNEY

BICYCLE TRAINING WHEEL BRACKET

This invention relates to a universal bicycle training wheel attachment for application to the rear wheel axle of a bicycle, and in particular to a torque arm for stabilizing the trainer-wheel support bracket.

It has been customary to mount bicycle training wheels on opposite sides of a bicycle frame adjacent the rear wheel of two-wheeled bicycles by means of downwardly and outwardly divergent training wheel support brackets some of which are secured to and carried by the framework, per se, of a bicycle; others of which are secured to and carried by the rear wheel axle of a bicycle; and still others of which are secured to and carried by both the framework and rear wheel axle of a bicycle.

Certain of the prior art bicycle training wheel attachments comprise an L-shaped, unitary support member which includes a depending, training-wheel-support bracket and a forwardly extending frame-engaging arm such as, by way of example, is disclosed in U.S. Pat. No. 3,401,954. Such training wheel attachments are designed for one particular size of bicycle which necessitates an inventory of a large number of different sizes of attachments, one for each of the various sizes of bicycles.

In order to provide a universal training wheel attachment which would accommodate different sized bicycles, vertically adjustable, training wheel-supporting brackets were designed to be received within the sleeve of a frame-engaging, axle-supported torque arm such as, by way of example is disclosed in U.S. Pat. No. 2,527,413 wherein adjustment of the training wheel supporting bracket is dependent upon and is a function of the frictional clamping efficiency of the sleeve of the torque arm.

Universal training wheel attachments have also utilized vertically adjustable training wheel supporting brackets which are received within the guide channel of a multileg mounting bracket by means of a bolt which extends through the bicycle frame, adjacent the rear wheel axle, and which is also secured to the rear wheel axle such as, by way of example, is disclosed in U.S. Pat. No. 2,828,141.

Efforts to simplify the mounting of a universal training wheel attachment to the rear axle of a bicycle have resulted in a vertically adjustable training wheel-support bracket in conjunction with a separate torque arm, portions of which engage the aforesaid bracket and other portions of which engage the bicycle frame. These later devices, while comparitively inexpensive have presented not only serious mounting problems but also safety problems because of the insecure mounting which results when both the training wheel supporting brackets and torque arms are mounted on the ends of the rear wheel axle of a bicycle.

The present invention is particularly directed to a torque arm which not only effectively stabilizes the trainer-wheel support bracket against accidental or unintentional movement about the rear wheel axle of a bicycle but which also provides for a secure, safe, though adjustable, attachment to the rear wheel axle of a bicycle.

The rear fork members of a bicycle frame usually terminate in a flat plate through which the rear axle passes, and said plate serves as a junction member supporting the upper and lower rear fork members, which members are usually welded or brazed to the plate. The rear fork members of the frame are usually of tubular round stock, and the diameter thereof substantially exceeds the thickness of the flat junction plate. Due to the variation between the plate thickness and the diameter of the fork members in the region of the plate, attempts to mount training wheel support brackets and their torque arms upon the frame in the region of the rear axle, were often attended by difficulty in making the parts register without cocking or binding.

In many instances, the horizontal rear fork member interferred with flatwise disposition of the torque arm base upon the flat face of the junction plate, with the result that the torque arm was either bent or cocked incident to tightening of the axle nut against the torque arm base and the training wheel support bracket, thereby producing an insecure mounting of the bracket. One obvious solution for this situation was to apply a number of washers between the bracket and the junction plate, but in many instances the insertion of washers objectionably reduced the number of axle threads available for proper support of the axle nut. Objectionable interference was experienced also when driving chain adjustments were made by shifting the rear axle along the length of the axle support slots in the junction plates of the rear fork.

An object of the present invention is to provide an improved, universal bicycle training wheel attachment for application to the rear wheel axle of a bicycle, which will eliminate the objectionable cocking and for bending of the torque arm incident to mounting of the attachment upon the bicycle, and thereby eliminating also the danger of parts becoming loose or detached, with possible injury to the rider.

Another object of the invention is to obviate the need for inserting corrective washers in applying the training wheels, with resultant economies in expenditure of labor and cost of materials.

A further object of the invention is to enhance the appearance as well as the effectiveness of a training wheel attachment for bicycles.

Another object is to simplify and expedite the application of training wheels to bicycles of all types and sizes.

The foregoing and other objects are attained by the means described herein and illustrated upon the accompanying drawing in which:

FIG. 1 is a perspective view of one side of a bicycle training wheel attachment embodying the improvements of the present invention associated with the rear axle of a bicycle.

FIG. 2 is an exploded view of the rear fork member, the rear axle, the torque arm and training wheel support bracket of FIG. 1.

FIG. 3 is a fragmentary top plan view of the assembly of FIG. 1.

Referring to FIG. 2, the reference numeral 8 indicates the rear wheel axle of a bicycle, and as usual, the axle has opposite screw-threaded ends 10 and 12 each adapted to accommodate a nut such as is shown at 14. The axle is adapted to span a pair of spaced substantially parallel and substantially identical rear fork members of a bicycle frame, one of which members is denoted 16 upon FIG. 2. Between the spaced rear fork member is usually supported, by means of axle 8, the rear wheel W and its hub H, the chain driven sprocket 9, and other accessory elements usually associated with the rear wheel. By means of nuts 14, the axle may be securely fixed at its opposite ends of the rear fork members of the bicycle frame.

Each rear fork member usually includes a substantially flat plate 18 which is slotted as at 20 to receive an end portion of axle 8. The axle is adjustable along the length of the slot, usually for the purpose of adjusting the tension of the drive chain in well known manner (by means not illustrated).

The frame member 22 extends forwardly to the hanger bearing housing, while frame member 24 inclines upwardly to the region of the bicycle seat post. Both of the members 22 and 24 are formed of tubular metal stock which is substantially cylindrical of cross section. At the ends 26 and 28, the members 22 and 24 are permanently fixed to plate 18 in any suitable manner, as by means of a welding or brazing operation.

It should be understood that plate 18, which may be referred to as a junction plate, is of substantially less thickness than the diameter of fork members 22 and 24. Also, the plate is thinner than any measurement taken transversely through the somewhat flattened end portions 26 and 28 of the fork members, where they overlap or engage the plate. Otherwise stated, the fork member ends 26 and 28 form lateral protuberances upon the outer face 30 of the junction plate at locations quite close to axle slot 20. These protuberances in most cases interfere with proper mounting of training wheel assemblies upon the bicycle, as was mentioned in the introductory portion of this description.

One-half, or one side of training wheel attachment is illustrated in the FIGS. it being understood that such attachments are applied to the bicycle as a pair, one for the left side and another for the right side of the bicycle. Since the left and right attachments are substantially identical, a description of one will suffice for the other also.

In FIG. 2, the numeral 32 denotes a rigid bracket having a lower end 34 upon which is rotatably supported a wheel 36 (FIGS. 1 and 3). At the upper end of the bracket is provided an upright flat mounting base 38 having formed therein one or more elongate openings or slots 40, 42, either of which may accommodate an end such as 10, of axle 8. The bracket end portion 34 is located in a plane offset from the plane of mounting base 38, so that the stabilizing or balancing wheel 36 will be positioned at a distance from the mean plane of the bicycle frame. For the purpose, that portion 35 of the bracket which is intermediate the ends 34 and 38, is inclined downwardly and outwardly from base 38. As is apparent from the drawing, the mounting base is of uniform thickness and has opposite parallel side edges 44,44. The slots 40 and 42 extend lengthwise of the mounting base. The numeral 46 denotes generally the torque arm of rigid metal formed to provide first and second, opposed, U shaped portions A and B. Portion A is defined by an intermediate panel, portion or wall 49 and a pair of outturned end panels or walls 50 and 53, whereas portion B is defined by an intermediate panel, portion or wall 52 and a pair of inturned end panels or walls 48 and 53, wherein panel or wall 53 is common to each of U shaped portions A and B, and wherein portions 49 and 52 are disposed in parallelism, but in different planes. Excellent results have been obtained in those instances in which the length of U shaped portion B is from 2½ to four times the length of portion A wherein the lengths are measured between end walls 48–53 and 53–50 respectively.

As best illustrated in FIG. 2 the torque arm comprises opposite end portions 48 and 50, and an elongate substantially straight and flat intermediate portion 52. The end portion 48 is bifurcated, and turned at an approximate right angle to portion 52.

The end portion 50 of the torque arm includes a transverse recess or channel 54 receptive of the bracket base 38 and is provided with an elongate slot 56 extending lengthwise of wall 49 of the torque arm. Slot 56 is dimensioned to accommodate an axle end such as 10, and is so located as to register with either of the slots 40 or 42 of mounting base 38. Thus, the assembly of FIG. 2 may be mounted upon the flat junction plate 18 with axle end 10 projected through the slots 56 and 40, after which a nut 14 may be applied at 10 to secure the bracket and its associated torque arm 46 flatly against the flat outer face 30 of junction plate 18. At the same time, the spaced fingers 58, 58 of the torque arm end 48 form a recess wherein is embraced the horizontal fork member 22 of the bicycle frame at a distance from axle 8, to preclude rotation of the torque arm and bracket 32 relative to axle 8.

It is important to note that the intermediate portion 52 of the torque arm is disposed outwardly of the plane of bracket base 38, so as to overlie without contacting (see FIG. 3) the end portion 26 of frame member 22. Moreover, wall 49 of channel portion 54 of the torque arm is disposed between the bracket base 38 and the outer face 30 of the junction plate 18, with the back face 60 of wall 49 flatly abutting the junction plate face 30. The rear face 62 of bracket base 38 flatly abuts the outer face of 49 of channel 54, and the outer face of the bracket base receives the direct impact of nut 14 when assembly is completed. Of course, the nut may be backed up by a washer (not shown) in accordance with accepted practice.

By assembling the training wheel structure upon the rear fork of the bicycle frame as above described, the frame member end 26 will offer no interference with proper and accurate seating of the torque arm base upon junction plate 18, and the torque arm will not be twisted or bent out of shape as nut 14 is drawn tight upon the axle end. Moreover, there is avoided the usual makeshift procedure of piling washers upon the axle against the plate 18 in order to space the torque arm from the frame member end portion 26 to avoid cocking and possible bending the torque arm as nut 14 is drawn tight. As was previously pointed out, the excessive use of washers for spacing purposes left only a few axle threads exposed for engagement by the nut, and this practice dangerously weakened the bracket mounting and fixation of the axle upon the rear fork.

The elongate slots 40 and 42 provide for vertical adjustment of wheel 36 with relation to a supporting surface, as may be necessary to support the bicycle frame in a vertical plane. As will be understood, a complete training wheel set consists of two brackets 32, two wheels 36, and two torque arms 46. The accompanying drawing illustrates the elements necessary to equip only the left side of a bicycle frame, the understanding being that the right side will be similarly equipped with substantially identical elements.

What is claimed is:

1. A training wheel structure for application to a bicycle having a rear wheel fork characterized by a substantially flat junction plate and a forwardly directed frame member secured upon a flat face of said plate so as to form a protuberance thereon, said plate having an opening receptive of a rear wheel axle, said structure comprising: an elongate bracket having a lower end portion supporting a training wheel, and an upper end portion apertured to accommodate the screw-threaded end of a bicycle wheel rear axle; an elongate torque arm having one end including means to embrace the forwardly directed frame member aforesaid, and an opposite apertured end including means to embrace the upper end portion of the bracket; said torque arm having an elongate portion intermediate the ends thereof adapted to overlie without contact the protuberant portion of said forwardly directed frame member.

2. The structure as defined by claim 1, wherein each end portion of the torque arm is provided with an open-mouthed recess, said recesses opening in opposite directions with reference to the elongate intermediate portion of the torque arm.

3. The structure as defined by claim 1, wherein said opposite end of the torque arm has a flat back face to flatly abut the aforesaid flat face of the junction plate.

4. The structure as defined by claim 3, wherein the plane of said flat back face intersects said one end of the torque arm.

5. The structure as defined by claim 3, wherein the plane of said flat back face intersects said one end of the torque arm, and lies to one side only of the torque arm intermediate portion.

6. A training wheel structure for application to a bicycle having a rear wheel fork characterized by a substantially flat junction plate and a forwardly directed frame member secured upon a flat face of said plate so as to form a protuberance thereon, said plate having an opening near said protuberance receptive of a rear wheel axle, said structure comprising: an elongate bracket having a lower end portion supporting a training wheel, an elongate upper end portion apertured to accommodate the screw-threaded end of a bicycle wheel rear axle, and in intermediate portion inclined to offset the lower end portion of the bracket from the upper end portion thereof, said upper end portion having a flat rear face defined by spaced parallelside edges; an elongate torque arm having one end including means to embrace the forwardly directed frame member aforesaid, and an opposite end bent to channel formation, said channel being transverse to the torque arm and including channel legs spaced apart to receive between them the apertured upper end portion of the bracket, with said flat rear face thereof flatly abutting the interior of the channel, and the side edges of said upper end portion substantially abutting the legs of the channel, said channel having a substantially flat back face to flatly abut the aforesaid flat face of the junction plate; said torque arm having an elongate portion intermediate the ends thereof, and from which elongate portion said one end extends, with the frame embracing means thereof projected in a direction generally opposite to the direction at which the channel opens to receive the upper end portion of the bracket.

7. The structure as defined by claim 6, wherein said elongate portion of the torque arm is disposed to one side of a plane which includes said back face of the channel.

8. The structure as defined by claim 6, wherein said elongate portion of the torque arm is disposed to one side of a plane which includes the back face of the channel and intersects the frame member embracing means of the torque arm.

9. The structure as defined by claim 8, wherein said frame member embracing means comprises a pair of spaced fingers between which said frame member is confined.

10. The structure as defined by claim 9, wherein said fingers extend at approximate right angles to the elongate intermediate portion of the torque arm.

11. The structure as defined by claim 6, wherein said frame member embracing means comprises a pair of integral fingers spaced apart and bent at an angle to the elongate intermediate portion of the torque arm.

12. The structure as defined by claim 11, wherein said elongate intermediate portion of the torque arm is disposed to one side of a plane which includes the back face of the channel and intersects the fingers aforesaid.

13. A torque arm for stabilizing a trainer wheel support bracket, comprising first and second U-shaped portions each of which include an intermediate wall between a pair of parallel, laterally spaced end walls which extend from an intermediate wall, wherein the intermediate walls of said U-shaped portions are in spaced parallism but in different planes, and wherein one end wall of each of said U-shaped portions is common to each of said portions, said first U-shaped portion having means for securing said torque arm to the flat junction plate of the frame members and rear wheel axle of a bicycle and receptive of a rectangular mounting portion of said support bracket between the end walls of said first U-shaped portion.

14. A structure as defined in claim 13, wherein the intermediate wall of said first U-shaped portion is provided with an opening receptive of a rear wheel axle.

15. The structure as defined by claim 14, wherein the intermediate and end walls of said first U-shaped portion define a channel dimensioned to receive the intermediate and said walls of a training wheel supporting bracket with the intermediate wall of said first U-shaped portion interposed on a rear wheel axle between adjacent surfaces of the flat junction plate and said bracket.

16. The structure as defined by claim 15, wherein the intermediate and end walls of the second U-shaped portion define a lever wherein that end wall remote from the end wall which is common to each of said U-shaped portions is bifurcated to engage a frame member at a location beyond the flat junction plate.

17. The structure as defined by claim 15 wherein the length of said second U-shaped portion is from 2½ to four times greater than the length of said first U-shaped portion.

18. A torque arm as in claim 13, wherein said second U-shaped portion has means for cooperative engagement with a frame portion of the bicycle.

* * * * *